(12) United States Patent
Pretorius et al.

(10) Patent No.: US 11,841,490 B2
(45) Date of Patent: Dec. 12, 2023

(54) ARRANGEMENT FOR LIGHT SHEET MICROSCOPY, IMMERSION OBJECTIVE, AND METHOD FOR REDUCING ABERRATIONS

(71) Applicant: Carl Zeiss Microscopy GmbH, Jena (DE)

(72) Inventors: Marco Pretorius, Oberkochen (DE); Lars-Christian Wittig, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 261 days.

(21) Appl. No.: 17/463,653

(22) Filed: Sep. 1, 2021

(65) Prior Publication Data

US 2022/0075169 A1    Mar. 10, 2022

(30) Foreign Application Priority Data

Sep. 4, 2020    (DE) ..................... 10 2020 211 148.0

(51) Int. Cl.
*G02B 21/00* (2006.01)
*G02B 21/36* (2006.01)

(52) U.S. Cl.
CPC ....... *G02B 21/0032* (2013.01); *G02B 21/367* (2013.01); *G06T 2207/10056* (2013.01)

(58) Field of Classification Search
CPC .. G02B 21/0032; G02B 21/367; G02B 21/00; G02B 21/0004; G02B 21/002;
(Continued)

(56) References Cited

U.S. PATENT DOCUMENTS 10,302,926 B2    5/2019  Pretorius
2017/0038575 A1    2/2017  Pretorius
(Continued)

FOREIGN PATENT DOCUMENTS

DE    10 2016 212 019    1/2018
DE    10 2016 212 020    1/2018
WO    2015/155027    10/2015

OTHER PUBLICATIONS

German Search Report dated Feb. 9, 2021 in German Application No. 10 2020 211 148.0.

*Primary Examiner* — Arnel C Lavarias
(74) *Attorney, Agent, or Firm* — Grüneberg and Myers PLLC (57) ABSTRACT

An arrangement for light sheet microscopy contains an illumination objective for illuminating a sample located on a slide in a medium with a light sheet, a detection objective, a separation layer system, a first adaptive optical detection correction element, and a further adaptive optical detection correction element and/or a first adaptive optical illumination correction element, and optionally, a further adaptive optical illumination correction element. The arrangement contains an adjustment device for the controlled movement of the first detection correction element and of the further detection correction element and/or of the first illumination correction element and of the further illumination correction element; and a control unit, to generate control commands and to actuate the adjustment devices by means of the control commands such that aberrations are reduced. Corresponding objectives and a corresponding method for reducing aberrations can be used.

11 Claims, 6 Drawing Sheets

(58) Field of Classification Search
CPC .............. G02B 21/0024; G02B 21/006; G02B 21/0072; G02B 21/0076; G02B 21/06; G02B 21/36; G02B 21/361; G02B 27/0025; G06T 2207/10056; G06T 2207/10064; G01N 21/6456; G01N 21/6458; G01N 2021/6463
USPC ....... 359/368, 362, 363, 369, 381, 385, 388, 359/390
See application file for complete search history.

(56) References Cited

U.S. PATENT DOCUMENTS

| | | |
|---|---|---|
| 2019/0170995 A1 | 6/2019 | Siebenmorgen et al. |
| 2019/0186895 A1* | 6/2019 | Kalkbrenner ...... G02B 21/0032 |
| 2019/0339505 A1 | 11/2019 | Siebenmorgen et al. |

* cited by examiner

| Coverslip thickness Refractive index | | d = 0.15 mm | d = 0.19 mm |
|---|---|---|---|
| 1.33 | s1 | 4.75739 | 6.00000 |
| | s2 | 4.81062 | 6.00000 |
| | g1 | 4.37491 | 4.29421 |
| | g2 | 9.95265 | 10.03336 |
| 1.36 | s1 | 4.58728 | 5.76118 |
| | s2 | 4.43462 | 5.52693 |
| | g1 | 4.51517 | 4.43962 |
| | g2 | 9.81239 | 9.88795 |
| 1.39 | s1 | 4.31638 | 5.40587 |
| | s2 | 3.94175 | 4.91687 |
| | g1 | 4.65502 | 4.58941 |
| | g2 | 9.67255 | 9.73815 |
| 1.415 | s1 | 3.98965 | 4.99117 |
| | s2 | 3.43106 | 4.28708 |
| | g1 | 4.77536 | 4.71805 |
| | g2 | 9.55221 | 9.60951 |
| 1.44 | s1 | 3.53608 | 4.42610 |
| | s2 | 2.81748 | 3.52859 |
| | g1 | 4.89723 | 4.85011 |
| | g2 | 9.43034 | 9.47745 |
| 1.465 | s1 | 2.89914 | 3.63894 |
| | s2 | 2.09093 | 2.62610 |
| | g1 | 5.01892 | 4.98446 |
| | g2 | 9.30864 | 9.34310 |
| 1.49 | s1 | 1.97859 | 2.49748 |
| | s2 | 1.24829 | 1.57300 |
| | g1 | 5.13934 | 5.11957 |
| | g2 | 9.18822 | 9.20800 |
| 1.515 | s1 | 0.59012 | 0.75385 |
| | s2 | 0.31361 | 0.39780 |
| | g1 | 5.25783 | 5.25257 |
| | g2 | 9.06973 | 9.07500 |
| 1.54 | s1 | -1.62181 | -2.03938 |
| | s2 | -0.54685 | -0.68919 |
| | g1 | 5.37797 | 5.38870 |
| | g2 | 8.94959 | 8.93887 |

Fig. 6

ARRANGEMENT FOR LIGHT SHEET MICROSCOPY, IMMERSION OBJECTIVE, AND METHOD FOR REDUCING ABERRATIONS

CROSS-REFERENCE TO RELATED APPLICATIONS

This application claims priority to German Patent Application No. 10 2020 211 148.0, filed on Sep. 4, 2020, the content of which is hereby incorporated by reference in its entirety.

BACKGROUND OF THE INVENTION

Field of the Invention

The invention relates to an arrangement for light sheet microscopy, to objectives, to a microscope having the arrangement, and to a method for reducing aberrations of an arrangement for microscopy.

Description of Related Art

Light sheet microscopy (Selective Plane Illumination Microscopy, SPIM) is frequently used in the life sciences to generate two-dimensional and three-dimensional presentations of sensitive, in particular living, samples. For this purpose, cylindrical lenses, and/or light beams scanned in a plane, and an illumination objective are used to generate thin light sheets, by means of which in particular fluorescent markers in the samples are excited to emit fluorescence radiation as detection radiation.

The detection radiation is typically collected by means of a detection objective, which is directed substantially perpendicularly onto the light sheet. The illumination objective and the detection objective are thus approximately aligned at right angles with respect to one another. On the way from the sample to the respective objective, the radiation of the illumination used for illumination and/or excitation and the captured detection radiation pass through a plurality of layers having differing optical properties, in particular having differing refractive indices. These layers are provided, for example, by a medium in which the sample is located and by an air gap between the objective and the medium. If the sample is present in a container having a see-through bottom or on a slide, and if the objectives are directed in an inverted arrangement through the container bottom or through the slide (both will be referred to below simply as slide) onto the sample, the layers are formed for example by the container bottom/slide and an air gap. The air gap can be filled in each case with an immersion medium. Since these layers separate the respective objective from the sample or from the medium, the term separation layer system is also used. When using an inverted arrangement, the layer system with the slide must additionally be illuminated obliquely, for example at an angle of 45° in each case or, for example, at an angle combination of 30° and 60°.

As a result of the, in particular oblique, passage of illumination radiation and detection radiation through the separation layer system, aberrations occur, which must be corrected as much as possible. Further imaging errors can arise as a consequence of differing refractive indices of the medium and must likewise be compensated.

The prior art discloses, for example in DE 10 2016 212 019 A1, an arrangement for light sheet microscopy, in which optical correction elements, with whose effect aberrations are largely reduced, are present in each case in the illumination objective and in the detection objective. Correction elements used can be, for example, what are known as Alvarez plates or wavefront manipulators derived from the effective principle of the former, as are described in DE 10 2012 101 262 B3. In this case, a wavefront manipulator having Alvarez plates consists of two plates that are displaceable relative to one another in an adjustment direction. Said plates are arranged orthogonal to the beam path of the relevant objective and are designed in the form of free-form surfaces on the side surfaces facing one another. The optical effect of the plates on radiation can be changed by a relative displacement of said plates relative to one another. The use of such wavefront manipulators in objectives for light sheet microscopy is known, for example, from WO 2015/155027 A1.

Corrections of the radiation that has passed through a separation layer system are made more difficult owing to the fact that the layers thereof do not have uniform thicknesses. For example, the material thicknesses of slides fluctuate owing to manufacturing-related reasons both within a slide and between different slides.

All the solutions from the prior art are able to achieve are the compensation of very small variations in the refractive index of the medium surrounding the sample (sample medium) of at most ±0.01 and thickness fluctuations for example of the slide in the range of approximately ±0.02 mm around a specific target value (for example 0.17 mm). None of the known arrangements make it possible to compensate greater changes in the refractive index of the sample (sample refractive index), for example of $\Delta n \geq 0.1$, in respect of the image error effect such that a diffraction-limited imaging quality is maintained and no complete exchange of optical assemblies is necessary.

SUMMARY OF THE INVENTION

It is the object of the invention to propose a possibility for correcting both fluctuations in the thickness of slides used and also differing refractive indices of the sample media and/or immersion media used that is improved compared to the prior art.

The object is achieved by the subject matter as described below. Advantageous developments are also described.

The object is achieved by an arrangement for light sheet microscopy, comprising an illumination objective, a detection objective, a separation layer system, and correction elements.

The invention also includes the following embodiments:
1. Arrangement for light sheet microscopy, comprising
   an illumination objective (2) for illuminating a sample (5) located on a slide (7) in a medium (8) via an illumination beam path with a light sheet (6), wherein the slide (7) is aligned with respect to a planar reference surface;
   a detection objective (3) in a detection beam path having an optical axis (A2) that is directed substantially orthogonally onto the light sheet (6) that has been generated;
   a separation layer system with at least one layer that is made from a specified material with a specified thickness and separates the medium (8) from the illumination objective (2) and the detection objective (3), wherein the separation layer system is in contact, at least in the region that is accessible for the illumination objective (2) and the detection objective (3) for illumination and detection, respectively, with the medium (8) by wav of a base surface that is parallel to the reference surface;

and a first adaptive optical detection correction element (12.1), which is arranged in the beam path of the detection objective (3) or is able to be introduced into the beam path thereof, and a further adaptive optical detection correction element (12.2) and/or a first adaptive optical illumination correction element (12.3), which is arranged in the beam path of the illumination objective (2) or is able to be introduced into the beam path thereof, wherein aberrations, which arise due to the oblique passage of light to be detected or of light for illuminating the sample (5) through boundary surfaces of a separation layer system that is present, are reduced by means of the detection correction elements (12.1, 12.2) that are present and/or by means of the illumination correction element (12.3) that is present, characterized in that an adjustment device (14.1) is present for the controlled movement of the first detection correction element (12.1) and/or an adjustment device (14.3) is present for the controlled movement of the first illumination correction element (12.3);

an adjustment device (14.2) for the controlled movement of the further detection correction element (12.2) is present;

a control unit (13) is present, which is configured, on the basis of information relating to the current position of the first detection correction element (12.1) and/or of the first illumination correction element (12.3), the current position of the further detection correction element (12.2), the current refractive index of an immersion medium used, and/or the current refractive index of a sample (5) to be imaged, and/or the current refractive index of the medium (8), to generate control commands and actuate the adjustment devices (14.1, 14.2, 14.3) by means of the control commands such that aberrations are reduced.

2. Arrangement according to embodiment 1, characterized in that an optical lens (9.22), which is displaceable in a controlled manner along the optical axis (A1, A2) of the detection objective (3), and an adjustment device (19) for the controlled movement thereof are present.

3. Arrangement according to embodiment 1 or 2, characterized in that the illumination objective (2) and/or the detection objective (3) are an immersion objective or immersion objectives.

4. Arrangement according to one of the preceding embodiments, characterized in that the optical axis (A1) of the illumination objective (2) and the light sheet (6) lie in a plane that encloses a non-zero illumination angle with the normal of the planar reference surface in respect of which the slide (7) is aligned, and the optical axis (A2) of the detection objective (3) encloses a non-zero detection angle with the normal of the reference surface.

5. Arrangement according to one of the preceding embodiments, characterized in that the first illumination correction element (12.3) and/or the first and the further detection correction element (12.1, 12.2) are formed in each case from a pair of optical elements that are movable relative to one another in a positioning direction.

6. Arrangement according to embodiment 5, characterized in that the positioning directions of the first and the further detection correction element (12.1, 12.2) are not parallel to one another.

7. Arrangement according to one of the preceding embodiments, characterized by a supply apparatus (20) for supplying an immersion medium to in front of a front lens (9.11) of the detection objective (3) and/or of the illumination objective (2), wherein the supply apparatus (20) is configured to transmit information of the current refractive index of a supplied immersion medium to the control unit (13).

8. Illumination objective (2) for illuminating a sample (5), comprising in its beam path optical elements and a first adaptive optical illumination correction element (12.3), which is arranged in the beam path or can be introduced into the beam path, and a further adaptive optical illumination correction element (12.4) with which aberrations, which occur owing to an oblique passage of light for illuminating the sample (5) through boundary surfaces of a separation layer system located between the illumination objective (2) and the sample (5), are reduced, characterized in that the first illumination correction element (12.3) is connected to an adjustment device (14.3) for the controlled movement of the first illumination correction element (12.3) or can be connected to such an adjustment device (14.3);

the further illumination correction element (12.4) is connected to an adjustment device (14.4) for the controlled movement of the further illumination correction element (12.4) or can be connected to such an adjustment device (14.4).

9. Detection objective (3) for capturing detection radiation of a sample (5), comprising in its beam path optical elements and a first adaptive optical detection correction element (12.1), which is arranged in the beam path or can be introduced into the beam path, and a further adaptive optical detection correction element (12.2) with which aberrations, which occur owing to an oblique passage of detection light of the sample (5) through boundary surfaces of a separation layer system located between the detection objective (3) and the sample (5), are reduced, characterized in that the first detection correction element (12.1) is connected to an adjustment device (14.1) for the controlled movement of the first detection correction element (12.1) or can be connected to such an adjustment device (14.1);

the further detection correction element (12.2) is connected to an adjustment device (14.2) for the controlled movement of the further detection correction element (12.2) or can be connected to such an adjustment device (14.2).

10. Detection objective (3) according to embodiment 9, characterized in that a first lens group (9.1), facing the sample (5) that is to be captured, is present, having an effect by which captured detection radiation (DS) is collimated, and an aperture stop (10), which is imaged to infinity by the first lens group (9.1) in the sample space, is arranged in the section of the beam path with the collimated detection radiation (DS) such that a telecentric beam path is brought about on the sample side.

11. Detection objective (3) according to embodiment 10, characterized in that a rotation-aspheric lens (9.12) is arranged in the beam path upstream of the aperture stop (10).

12. Objective (2, 3) according to embodiment 9, characterized in that an optical lens (9.22), which is displaceable in a controlled manner along the optical axis (A1, A2) of the detection objective (3) and/or of the illumination objective (2), and an adjustment device (19) for the controlled movement thereof are present.

13. Microscope (1), comprising an arrangement according to one of embodiments 1 to 7.

14. Method for reducing aberrations of an arrangement for microscopy, comprising the steps of arranging a sample (5) located in a medium (8) on a slide (7), wherein the slide (7) is aligned with respect to a planar reference surface, and the slide (7) is part of a separation layer system having a base surface that is aligned parallel to the reference surface and is in contact with the medium (8) at least in a region that is accessible for an illumination objective (2) and a detection objective (3) for illumination and detection, respectively, illuminating the sample (5) through the separation layer system via an illumination beam path with a defined light intensity distribution, in particular with a light sheet (6), using an illumination objective (2), wherein the illumination objective (2) comprises a first adaptive optical illumination correction element (12.3), which is arranged in the beam path or is able to be introduced into the beam path, and optionally a further adaptive optical illumination correction element (12.4), capturing detection radiation (DS) of the sample (5) through the separation layer system by means of a detection objective (3) in a detection beam path, wherein the optical axis (A2) of the detection objective (3) is directed substantially orthogonally to the optical axis (A1) of the illumination objective (2) and the detection objective (3) comprises a first adaptive optical detection correction element (12.1), which is arranged in the beam path or is able to be introduced into the beam path, and a further adaptive optical detection correction element (12.2);

reducing aberrations that arise due to the oblique passage of light to be detected or of light for illuminating the sample (5) through boundary surfaces of the separation layer system, by virtue of the fact that, based on information relating to the current position of the first detection correction element (12.1) and/or of the first illumination correction element (12.3), the current position of the further detection correction element (12.2) and/or of the further illumination correction element (12.4), the current refractive index of an immersion medium used, and/or the current refractive index of the sample (5) to be imaged, and/or the current refractive index of the medium (8), control commands are generated, and adjustment devices (14.1, 14.2, 14.3, 14.4) of the illumination correction elements (12.3, 12.4) and/or of the detection correction elements (12.1, 12.2) are actuated by means of the control commands.

15. Method according to embodiment 14, characterized in that image data captured by means of the detection objective (3) are evaluated with respect to specified image quality criteria; the results of the evaluations are transmitted to the control unit (13), and the control commands of the control unit (13) are generated taking into account the evaluation results.

DETAILED DESCRIPTION OF THE INVENTION

The illumination objective serves for illuminating a sample, which is located on a slide in a medium (sample medium), with a light sheet. The illumination here takes place along an illumination beam path. The slide is aligned in respect of a planar reference surface. The reference surface can be, for example, the surface of a table, which may be optionally adjustable. The detection objective is located in a detection beam path having an optical axis that is directed substantially perpendicularly onto the light sheet that has been generated. The optical axes of the illumination objective and the detection objective are advantageously aligned substantially orthogonal to each other, wherein deviations of up to +15°, in particular of up to 10°, preferably of up to 2°, are included and are understood to be substantially orthogonal.

The substantially orthogonal view of the detection objective onto the light sheet is achieved for example by the optical axis of the illumination objective and the light sheet lying in a plane that encloses a non-zero illumination angle with the normal of the planar reference surface in respect of which the slide is aligned, and the optical axis of the detection objective enclosing a non-zero detection angle with the normal of the reference surface.

A light source, in particular a laser light source, a scanner and/or an apparatus for beam shaping can be additionally arranged upstream of the illumination objective.

The separation layer system has at least one layer made of a specified material of a specified thickness, which separates the medium from the illumination objective and the detection objective. By means of a base surface that is aligned parallel to the reference surface, the separation layer system is in contact with the medium, at least in the region that is accessible for the illumination objective and the detection objective for illumination and detection, respectively. The term accessible region here refers to a section of the separation layer system, in particular comprising a slide, through which illumination radiation from the illumination optical unit or detection radiation from the detection optical unit passes or can pass.

A first adaptive optical detection correction element and at least one further adaptive optical detection correction element are arranged in the beam path of the detection objective (detection beam path) or can be introduced into the detection beam path, for example by sliding or pivoting. In addition, a first adaptive optical illumination correction element and optionally at least one further adaptive optical illumination correction element can be arranged in the beam path of the illumination objective (illumination beam path) or can be introduced into the illumination beam path, for example by sliding or pivoting. In this case, aberrations arising due to the oblique passage of light to be detected or light for illuminating the sample through boundary surfaces of an existing separation layer system can be reduced in particular by means of the detection correction elements that are present and/or by means of the illumination correction elements that are present.

An arrangement according to the invention is characterized by an adjustment device for the controlled movement of the first and of the further detection correction element. In further embodiments, an adjustment device for the controlled movement of the first and possibly the further illumination correction element is present. The adjustment device advantageously has controllable drives, which are operated in particular electrically.

In addition, a control unit is present, which is configured to generate control commands on the basis of at least one of the following stated items of information and to actuate the drives by means of the control commands such that aberrations are reduced. The information can be: a current position of the first detection correction element and/or of the first illumination correction element; a current position of the further detection correction element and/or of the further illumination correction element; the current refractive index of an immersion medium used; the current refractive index of a sample to be imaged, and the current refractive index of the medium.

In a particularly advantageous embodiment of the arrangement according to the invention, an adjustment device for the controlled movement of the further detection correction element and/or an adjustment device for the controlled movement of the further illumination correction element is/are present. These adjustment devices are also actuable by means of the control unit.

A significant advantage of the invention is that variably settable correction elements, in particular in connection with an objective, make substantially diffraction-limited multi-spectral imaging for numerical apertures ≥0.95 for a very wide region of immersion refractive indices (Δn≥0.1, in particular in a range from n=1.33 to 1.54) possible, without the need to change optical elements for this purpose. The entire range of applications in the fields of live cell imaging and fixed cell imaging can be covered by an arrangement according to the invention. Merely settable internal degrees of freedom of the system are used as compensators for correcting arising wavefront changes.

Changing the sample refractive index and changes in the thickness of the slide generally bring about similar imaging errors. However, the at least two independently settable wavefront manipulators or correction elements—preferably exactly two are present—advantageously allow the reduction in the spectra of the Zernike coefficients of the arising wavefront errors that deviate from one another specifically in the higher orders. Although a change in the refractive index in the sample, the medium, and the immersion medium and a change in the thickness of the slide does equally bring about field-independent coma and astigmatism as the leading non-rotation-symmetrical wavefront errors, specifically the portions in the higher orders that cannot be corrected with only one wavefront manipulator differ for the two imaging errors.

The correction elements are preferably wavefront manipulators in the form of in each case two Alvarez plates that are matched to one another. The latter also belong to the term free-form elements, which is used below. Each of the correction elements is thus formed from a pair of optical elements that are movable in a positioning direction relative to one another and substantially perpendicular to an optical axis. The positioning directions of the correction elements can be parallel to one another, as a result of which a small installation space suffices. In further embodiments of the invention, the positioning directions of the first and of the further detection correction element and/or the positioning directions of the first and of the further illumination correction element may not be parallel to one another. In such an embodiment, the constructive freedoms for the arrangement are greater and, depending on the design of the correction elements, additional and/or alternative combinations of the settings and optical effects of the correction elements can be provided.

Furthermore, the change in the sample refractive index also results in rotation-symmetrical errors, such as spherical aberration, field-dependent coma, and field-dependent astigmatism. These rotation-symmetrical wavefront errors can be corrected by means of settable air spaces between the optical elements in particular of the detection objective.

In a further embodiment of the arrangement according to the invention, an optical lens, which is displaceable in a controlled manner along the respective optical axis of the detection objective, and a drive for moving it in a targeted manner are therefore present. The drive can be operated manually, as described above. However, for precise setting, a high repetition accuracy, and comfortable operation, the drive is actuable by means of the control unit. In principle, such a displaceable optical lens can also be present in an illumination objective. The structural length of the relevant objective preferably remains constant despite the displacement of the optical lens, with the result that no additional installation space in the direction of the optical axis is required.

In order to reduce the refraction-related imaging errors, existing air gaps between the objectives and the slide or the medium will be filled with an immersion medium. In preferred embodiments of the arrangement according to the invention, the illumination objective and/or the detection objective are immersion objectives.

In order to guide an immersion medium in a targeted manner in particular between a respective front lens of the objectives and the slide, and to possibly also replace it or to exchange it for an immersion medium having a different refractive index, a supply apparatus may be present in an advantageous embodiment of the arrangement. In addition to the possibility of supplying and possibly draining or exchanging the immersion medium, this supply apparatus is designed to transmit information of the current refractive index of an immersion medium used to the control unit.

In further embodiments of the invention, an immersion medium, which typically differs from the immersion medium present in front of the front lens in terms of its optical properties, can be present or introduced between the free-form elements of the correction elements. It is thus possible to set a specified wavelength dependence of the wavefront change by way of the relevant wavefront manipulator. In particular, this effect can be achromatic. However, results from trials of the arrangement according to the invention and the objectives according to the invention show that a sufficiently chromatically stable image error compensation can also be attained by way of air between the free-form elements.

The large correction range of the arrangement according to the invention allows the use of light sheet microscopy for samples of different refractive indices embedded in different refraction-index-adapted media or immersion media such as water, glycerol, silicone oil or high-refraction immersion oil or are optically contacted using them. The media surrounding the sample and an immersion medium used generally have the same refractive indices. The arrangement according to the invention can be equipped both with an illumination objective and with a detection objective. The invention therefore also comprises an illumination objective and a detection objective, which are embodied each for being used in an arrangement according to the invention.

In this case, an illumination objective for illuminating a sample comprises in its beam path optical elements, for example optical lenses and the first adaptive optical illumination correction element, which is arranged in the beam path or is able to be introduced into the beam path, and optionally the further adaptive optical illumination correction element.

Aberrations arising due to an oblique passage of light for illuminating the sample through boundary surfaces of a separation layer system located between the illumination objective and the sample can be reduced using the illumination correction elements. The illumination objective is characterized in that the first illumination correction element is connected to the adjustment device for the controlled movement of the first illumination correction element or can be connected to such an adjustment device. The further illumination correction element is connected to the adjustment device for the controlled movement of the further illumination correction element or can be connected to such an adjustment device. The correction elements can be set so as to be coordinated to one another in terms of their optical effect, but are generally settable independently of one another. In alternative embodiments, the illumination objective has merely one static phase plate.

The component in an SPIM system that is critical with respect to the imaging quality is the high-aperture detection objective, because it delimits the achievable resolution and reacts particularly sensitively to disruptions in the parameters of the separation layers, through which the light beams travel, due to the high numerical aperture. A detection objective, which is likewise part of the invention, serves for capturing detection light of a sample and comprises, in its beam path, optical elements, for example optical lenses. In addition, the first adaptive optical detection correction element, which is arranged in the beam path or is able to be introduced into the beam path, and the further adaptive optical detection correction element are present. The technical effect of the detection correction elements consists in the reduction in aberrations that arise due to an oblique passage of detection light of the sample through boundary surfaces of a separation layer system located between the detection objective and the sample.

The detection objective is characterized according to the invention in that the first detection correction element is connected to the adjustment device for the controlled movement of the first detection correction element or can be connected to such an adjustment device. The further detection correction element is connected to the adjustment device for the controlled movement of the further detection correction element or can be connected to such an adjustment device.

Both the illumination objective and the detection objective have interfaces, at which a mechanical and/or electrical energy is transferred or can be transferred to the element to be adjusted, that is to say to the relevant first or further illumination correction element or the first or further detection correction element.

The adjustment devices, for example motor drives, can be present in or at the illumination objective or detection objective and be integrated for example in a housing of the respective objectives.

The construction of an objective according to the invention will be explained by way of example on the basis of a possible embodiment of the detection objective (imaging objective).

The technical elements and the optical effects thereof can also be present and realized accordingly in an illumination objective.

A detection objective according to the invention has a first lens group. The wavefronts coming from the sample, which, after passage through the separation layer system, are impacted by the disturbing influences of the separation layer system and the possibly further disturbing influences due to, for example, the immersion medium, are imaged approximately to infinity by means of the first lens group, and a section of the detection beam path is generated with approximately collimated detection radiation (collimated beam path).

An aperture stop is arranged in the collimated beam path downstream of the first lens group. The aperture stop is imaged to infinity by the first lens group into the object space (sample space), with the result that approximately a telecentric beam path is formed on the sample side (object side).

Downstream of the aperture stop, the at least two correction elements, in particular in the form of wavefront manipulators having in each case two free-form elements that are movable with respect to one another substantially perpendicular to the optical axis of the detection objective, are arranged in the collimated beam path. Due to the effect of the correspondingly set correction elements, imaging errors of the wavefronts are reduced by virtue of the fact that opposite errors of the same type and magnitude are imprinted on the wavefronts. The free-form elements can in each case be embodied to be planar on one of their sides, in particular on the side surfaces that face the outside, i.e. face away from one another.

In further embodiments, both side surfaces of the free-form elements can have a free-form surface. For example, a symmetric distribution of the height differences ("sagittal heights") over the surface profiles of the front and rear sides of a free-form element can have the effect that the profile depths on each side surface remain sufficiently low. For example, a photolithographic production of the free-form elements is thus made easier.

Additionally it is possible that the free-form elements of the wavefront manipulators consist of materials or comprise materials that have a specified abnormal partial dispersion, that is to say a deviation of the refractive index dispersion from the normal line, such as long crown glasses or short flint glasses. In this way, secondary chromatic aberrations can be set in a targeted manner.

The arrangement according to the invention can be provided with immersion media between the free-form elements, which have a dispersion that deviates from the normal line, as a result of which secondary chromatic aberrations occur in a likewise targeted manner. With a combination of suitable media and/or glasses with abnormal partial dispersion between the free-form elements, it is also possible to set tertiary chromatic aberrations.

An existing second lens group images the corrected wavefronts onto a detector or into an intermediate image plane. The first and second lens groups functionally form a main objective for example of a microscope. At least one optical lens that is displaceable in a controlled manner along the optical axis can optionally be present within the second lens group.

Alternatively, a number of settable air spaces can be present, that is to say the distance between at least two optical lenses can be set.

At least one further lens group, which acts as a tube lens system or for example as an adapter optical unit for a camera to be connected, can likewise be optionally present.

The second lens group can be approximately afocal so as to be able to freely combine different main objectives with different microscope tube systems ("infinity interface"). In this case, a third lens group (tube lens group), which together with the first and second lens groups generates a real intermediate image that can either be viewed in magnified form or can be recorded by a detector, is also provided downstream of the second lens group.

In a further possible embodiment, in addition to the spherical lenses, at least one further rotation-aspherical lens can be arranged near the aperture stop. The use of at least one asphere is advantageous in particular in the case of objectives having the highest aperture or large aperture angles and supports a correction of the typical spherical aberration. In specific embodiments of the invention, the use of aspherical lenses in many cases can be dispensed with. A sufficiently high image quality, which can be expressed for example by Strehl values of over 90%, is achieved even without such aspheres.

The arrangement according to the invention can be a constituent part of a microscope. A microscope having an arrangement according to the invention is therefore also a subject of the invention.

The object on which the invention is based is additionally achieved by a method for reducing aberrations of an arrangement for microscopy, in particular for light sheet microscopy. The method comprises the step of arranging a sample located in a medium on a slide, wherein the slide is aligned with respect to a planar reference surface, and the slide is part of a separation layer system having a base surface that is aligned parallel to the reference surface and is in contact with the medium at least in a region that is accessible for an illumination objective and a detection objective for illumination and detection, respectively. The step of illuminating the sample through the separation layer system via an illumination beam path with a defined light intensity distribution, in particular with a light sheet, using an illumination objective is furthermore part of the method. It is followed by capturing detection radiation of the sample through the separation layer system by means of a detection objective in a detection beam path, wherein the optical axis of the detection objective is directed substantially orthogonally to the optical axis of the illumination objective and the detection objective comprises a first adaptive optical detection correction element, which is arranged in the beam path or is able to be introduced into the beam path, and a further adaptive optical detection correction element. Aberrations arise due to the oblique passage of light to be detected or of light for illuminating the sample through boundary surfaces of the separation layer system. These aberrations are reduced by virtue of the fact that, based on information regarding the current position of the first detection correction element and/or of the first illumination correction element, the current position of the further detection correction element and/or of the further illumination correction element, the current refractive index of an immersion medium used, and/or the current refractive index of the sample to be imaged, and/or the current refractive index of the medium, control commands are generated. The control commands can be transmitted to a user for execution and/or be used for actuating the adjustment device. In order to evaluate the information and to generate the control commands, a correspondingly configured control unit is advantageously used, which is realized for example by way of a computer.

The control commands can be generated on the basis of existing data collections (for example lookup tables) in that the currently available information is compared to the data collections and corresponding control commands are generated.

For each objective designed according to the invention, the adjustment movements for different combinations of refractive indices and coverslip thickness can be calculated in advance in the optic design program, and these values can be stored for example in the form of a lookup table in a programmable memory of the control unit. In practice, the available refractive indices and the respective coverslip thickness would have to be known to this end so as to be able to derive the travels therefrom.

In further configurations of the method, image data and the image quality thereof can be used for example as control variables. For example, the abovementioned information and the image data or the quality thereof can be correlated to one another and be repeatedly compared for example in the manner of feedback control. To this end, image data captured by means of the detection objective can be evaluated with respect to specified image quality criteria and the results of the evaluations can be transmitted to the control unit. The control commands of the control unit are generated taking into account the evaluation results. The evaluation of the captured image data can be effected by means of a subunit of the control unit 13 that is configured therefor.

It is possible for example to look for a suitable region at which a suitable image quality criterion can be derived, in the image data or in a captured image. For example, it is possible to determine an "edge slope" of an imaged object structure, a full width at half maximum of a structure in the image that is assumed to be point-shaped or line-shaped in the object, or generally an image contrast. Changes resulting from individual experimental adjustment movements can be detected, and a composite adjustment movement can be ascertained therefrom in a linear approximation. Subsequently, the optimum actuator travels can be ascertained iteratively using a suitable gradient descent method.

Advantages of the invention reside in the broad applicability in particular for light sheet microscopy. In this case, there is no need to interchange optical elements, such as objectives, if the optical conditions of the image capture change significantly between different samples and/or over a time period and can have for example refractive indices in a range from n=1.33 to 1.54. Diffraction-limited imaging is possible with the invention for example for numerical apertures of ≥0.95 to ≥1.1.

Figure 1:
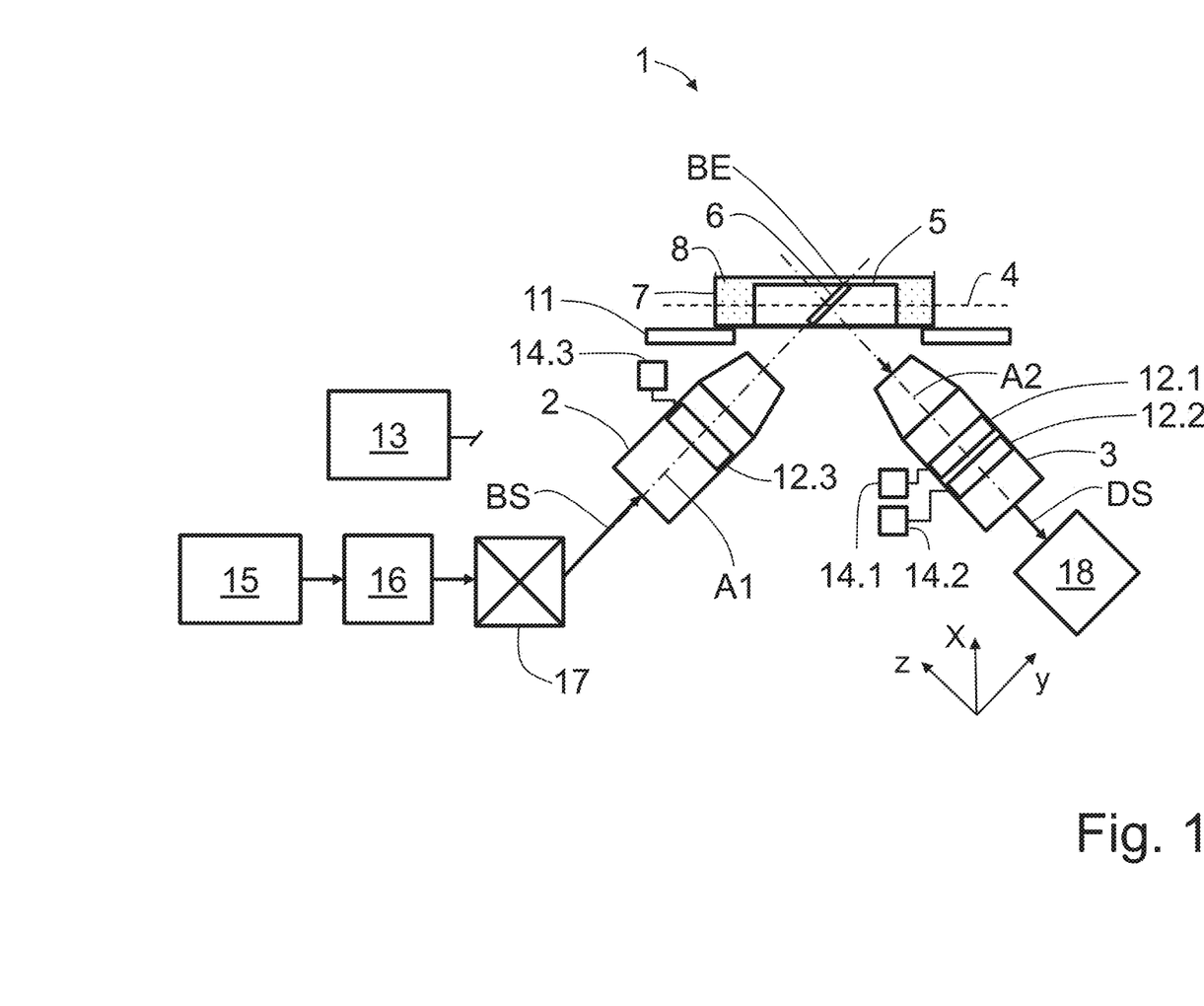
FIG. 1 shows a schematic illustration of an exemplary embodiment of an arrangement according to the invention for light sheet microscopy as an integral part of a microscope.
Figure 2:
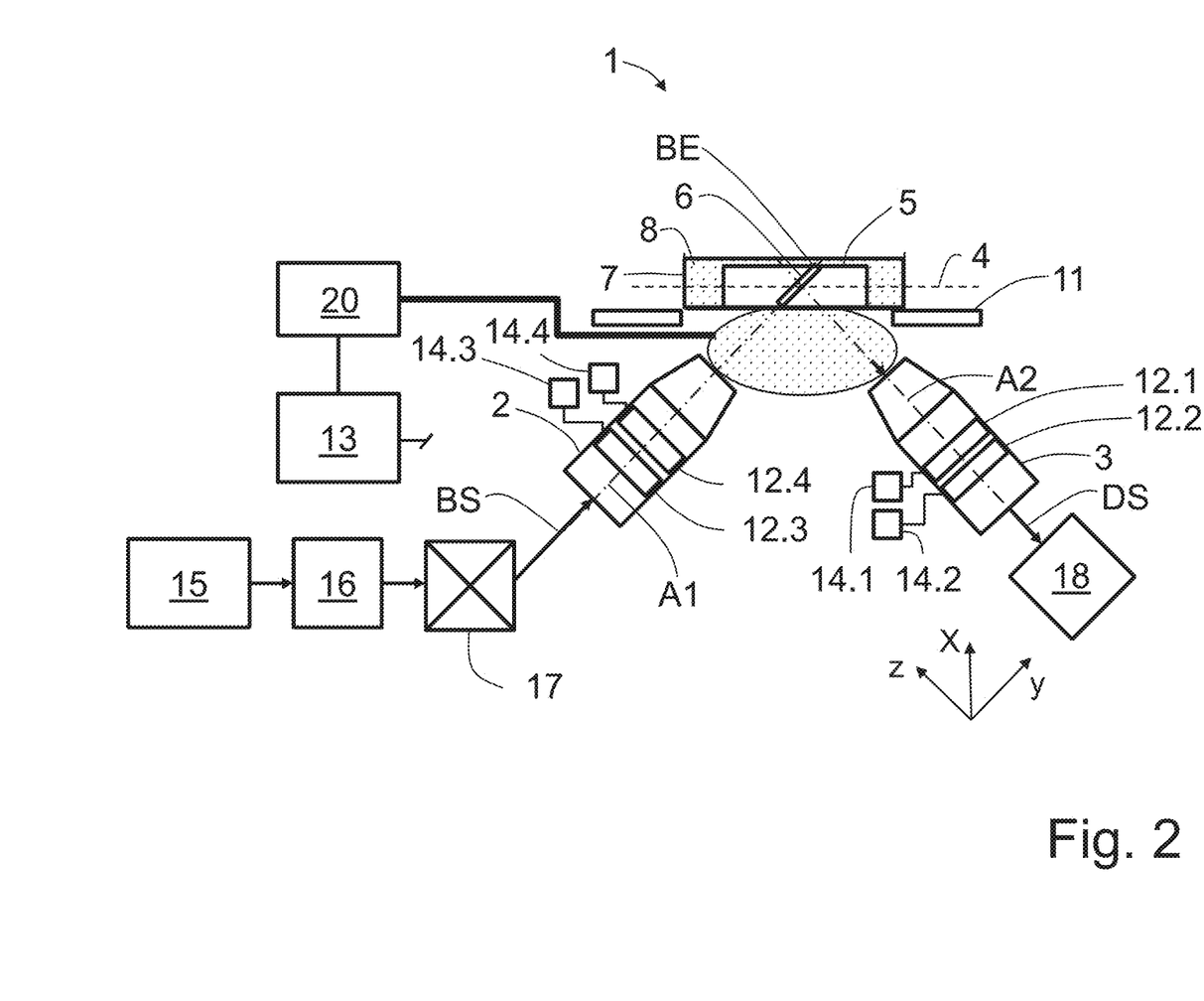
FIG. 2 shows a schematic illustration of a second exemplary embodiment of an arrangement according to the invention for light sheet microscopy as an integral part of a microscope, having a supply apparatus for supplying immersion media.
Figure 3:
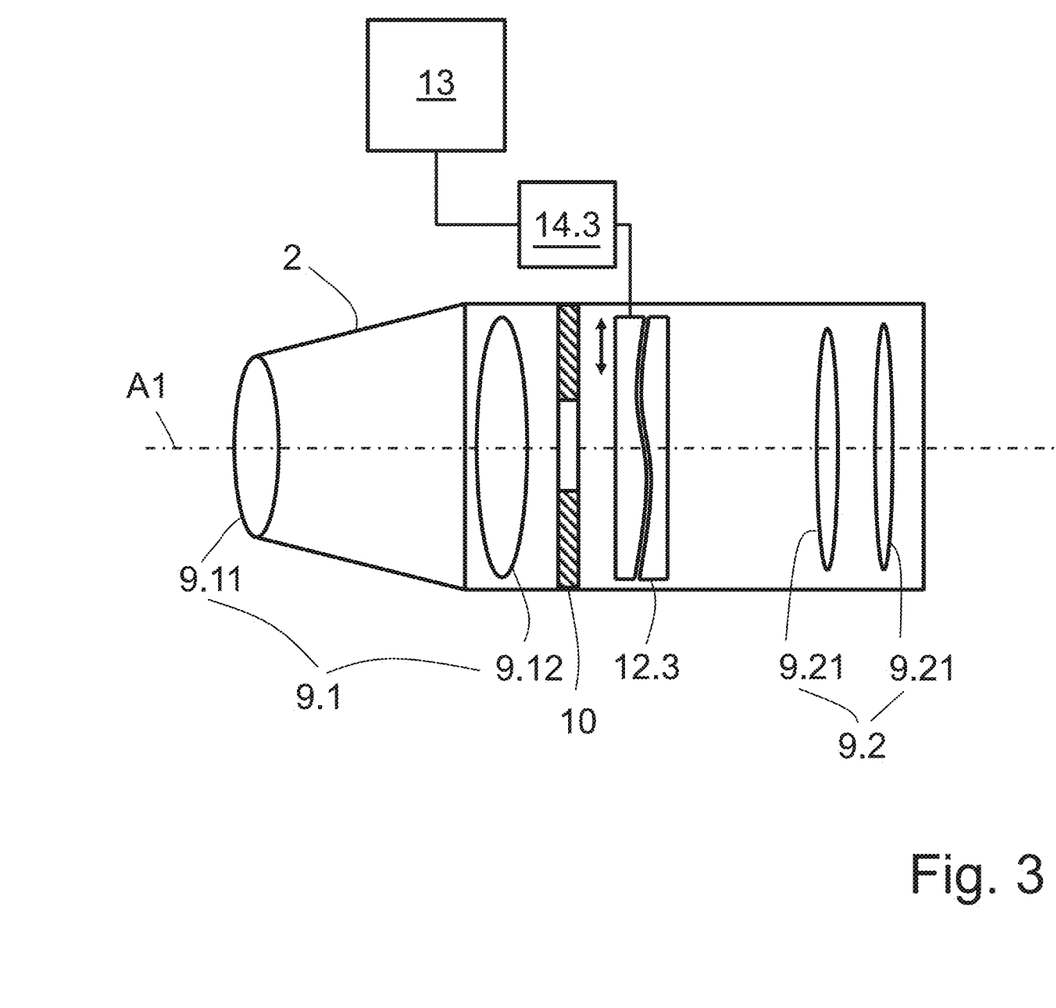
FIG. 3 shows a schematic illustration of an exemplary embodiment of an arrangement according to the invention with an illumination objective according to the invention.
Figure 4:
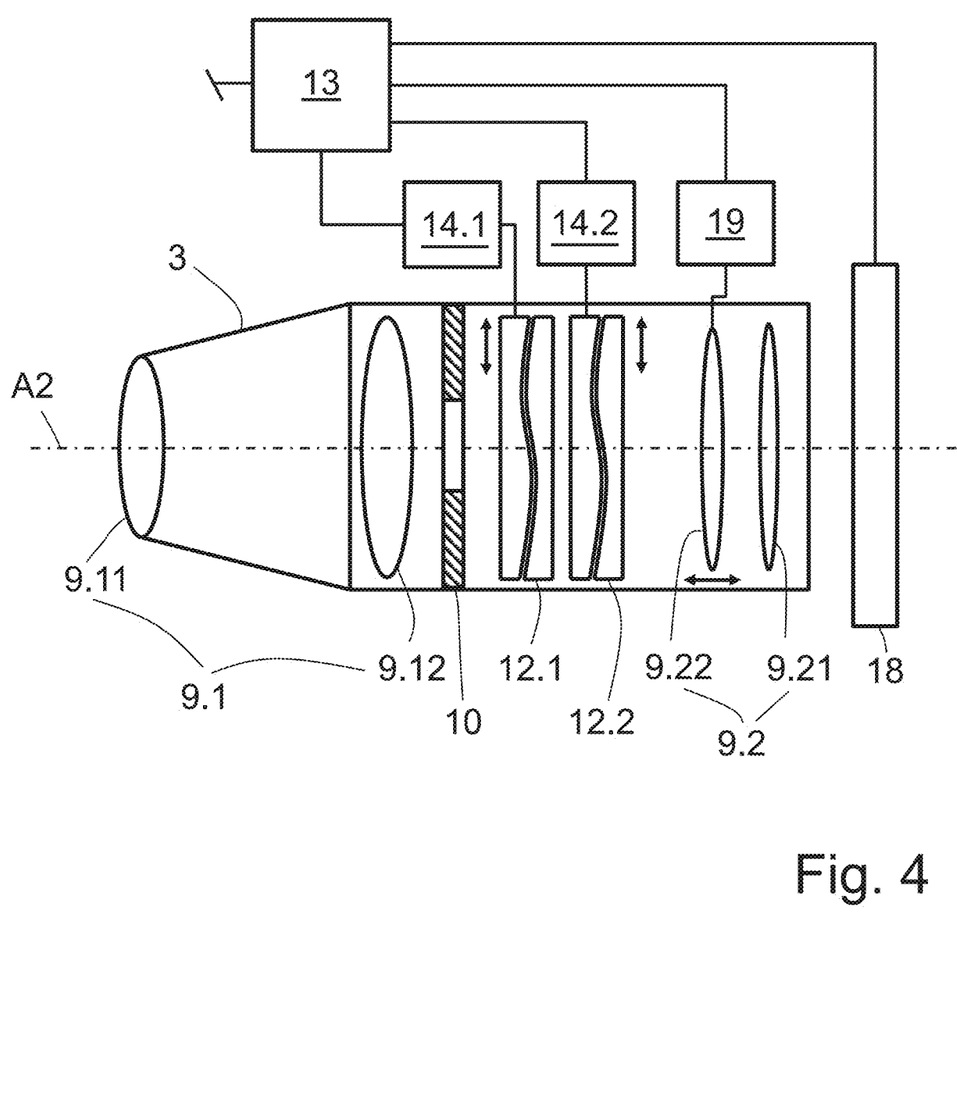
FIG. 4 shows a schematic illustration of an exemplary embodiment of an arrangement according to the invention with a detection objective according to the invention.
Figure 5:
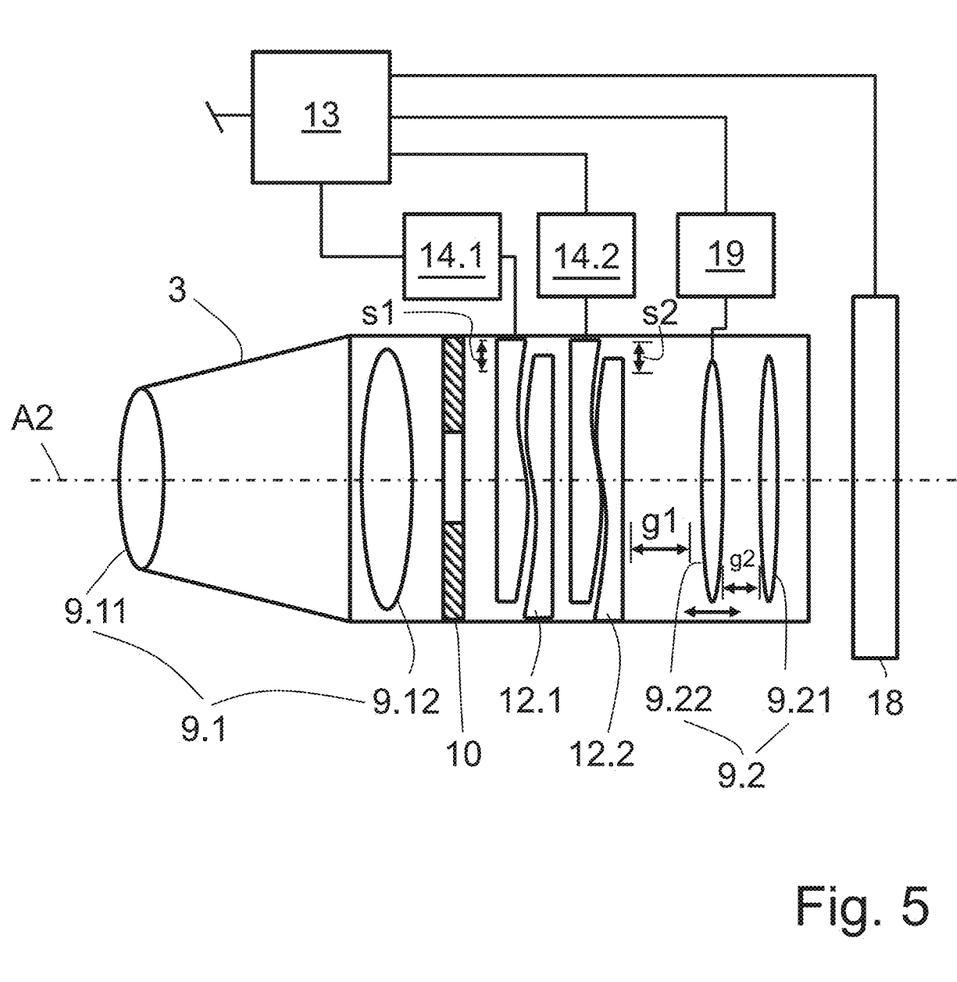
FIG. 5 shows a schematic illustration of the exemplary embodiment of the arrangement according to the invention with the detection objective according to the invention in an operating state with transversely adjusted correction elements.
Figure 6:
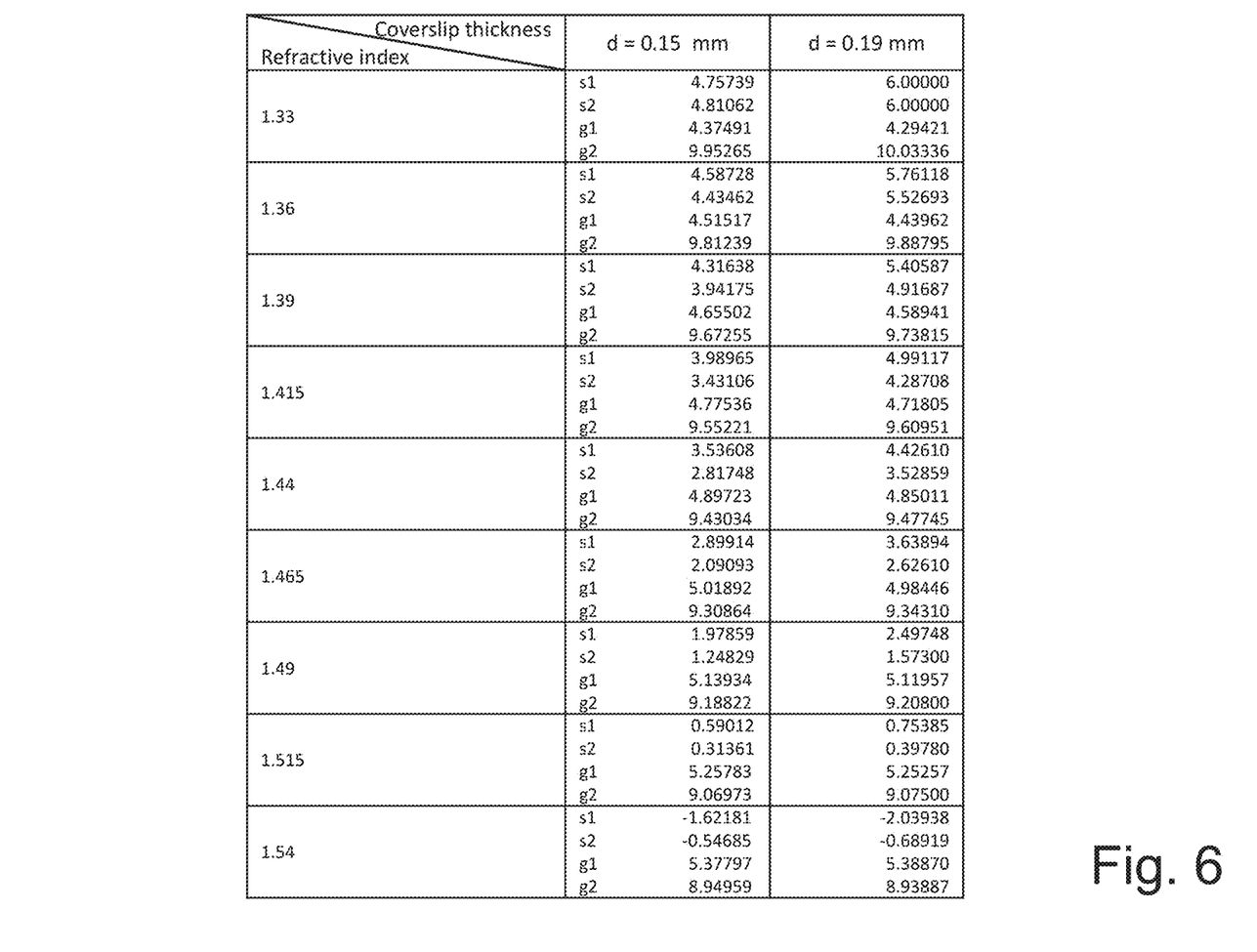
FIG. 6 shows a table with travels that are to be realized by way of example and with axial extents of variable air spaces in a detection objective according to the invention in dependence on different refractive indices and coverslip thicknesses.

The invention is explained in more detail below on the basis of exemplary embodiments and figures. In the figures:

FIG. 1 shows a schematic illustration of an exemplary embodiment of an arrangement according to the invention for light sheet microscopy as an integral part of a microscope;

FIG. 2 shows a schematic illustration of a second exemplary embodiment of an arrangement according to the invention for light sheet microscopy as an integral part of a microscope, having a supply apparatus for supplying immersion media;

FIG. 3 shows a schematic illustration of an exemplary embodiment of an arrangement according to the invention with an illumination objective according to the invention;

FIG. 4 shows a schematic illustration of an exemplary embodiment of an arrangement according to the invention with a detection objective according to the invention;

FIG. 5 shows a schematic illustration of the exemplary embodiment of the arrangement according to the invention with the detection objective according to the invention in an operating state with transversely adjusted correction elements; and FIG. 6 shows a table with travels that are to be realized by way of example and with axial extents of variable air spaces in a detection objective according to the invention in dependence on different refractive indices and coverslip thicknesses.

In the following schematic illustrations of examples from the prior art and exemplary embodiments of the invention, the same reference signs denote the same elements. Lens groups 9.1, 9.2 or optical lenses 9.11 to 9.22 are illustrated schematically with uniform biconvex lens forms, independently of their actual shape.

FIG. 1 illustrates an exemplary embodiment of an arrangement according to the invention as integral parts of an inverted microscope 1 having an illumination objective 2 and a detection objective 3. A light sheet 6 is produced or producible along a first optical axis A1 by means of the illumination objective 2 and illumination radiation BS, said light sheet being usable to examine a sample 5 arranged in a sample plane 4. The detection objective 3 has a second optical axis A2, along which detection light DS coming from the sample plane 4 is directed onto a detector 18 and may be captured thereby. The first optical axis A1 and the second optical axis A2 are aligned orthogonal to one another and each enclose an angle of 45° with the sample plane 4, which serves as a reference plane. The sample 5 is arranged in a sample holder which is situated, as the slide 7, on a sample stage 11 and filled with a liquid as the medium 8 surrounding the sample 5.

In the exemplary embodiment illustrated, the illumination objective 2 is equipped with a first illumination correction element 12.3. The detection objective 3 is provided with a first detection correction element 12.1 and a further detection correction element 12.2. Reference is also made below to a first and a further correction elements 12.1, 12.2, 12.3, and 12.4 if the concrete assignment to the illumination objective 2 or the detection objective 3 is not technically relevant.

The first correction elements 12.1 and 12.3 and the further correction elements 12.2 and 12.4 serve to correct aberrations which may occur on account of the oblique passage of the illumination radiation BS through the bottom of the slide 7.

Each of the correction elements 12.1, 12.2, 12.3, and 12.4 are connected to an adjustment device 14.1, 14.2, 14.3, or 14.4 in the form of a motor drive each, which are actuable by means of a control unit 13 (only indicated). The adjustment devices 14.1 to 14.4 can be electrical drives or piezoelectric drives.

One of or each of the objectives 2, 3 can optionally have a further adjustment device 19, by means of which a displaceable optical lens 9.22 can be displaced in a controlled manner along the second optical axis A2 (see FIGS. 4 and 5).

The slide 7 is optionally held on a sample stage 11. The sample stage 11 itself is adjustable in a controlled manner by means of drives (which are not illustrated in more detail).

The illumination radiation BS is provided by a laser module 15 and shaped by means of a beam-shaping unit 16. The beam-shaping unit 16 is, for example, an optical unit by means of which the provided illumination radiation BS is collimated, for example. The beam-shaping unit 16 can in further embodiments comprise a cylindrical optical unit having an effect by means of which the illumination radiation BS is compressed in a direction transversely to the first optical axis A1. A scanner 17 is present downstream of the beam-shaping unit 16, with the shaped illumination radiation BS being deflectable in a controlled manner in two directions transversely to the first optical axis A1 by means of said scanner (also known as XY scanner). The illumination radiation BS that is deflected by the scanner 17 reaches the illumination objective 2 and is shaped and/or focused by the latter.

The control unit 13 is present for the purposes of actuating the optionally present adjustment device 19 of the displaceable optical lens 9.1, the sample stage 11, the adjustment devices 14.1 to 14.4, the laser module 15, the beam shaping 16, the scanner 17 and/or the detector 18, with said control unit being connected for the transmission of data to the elements to be actuated.

In further embodiments, the control unit 13 is additionally configured to capture, store and/or evaluate measurement values. Further elements and units of the microscope 1 may be actuable by means of the control unit 13 and/or measurement values can be obtained and evaluated thereby.

In order to be able to supply an immersion medium between a front lens 9.11 of the first lens group 9.1 (see FIGS. 3, 4, 5) and the slide 7, a supply apparatus 20 for supplying immersion media is present according to a second exemplary embodiment of an arrangement according to the invention (FIG. 2). The supply apparatus is likewise connected to the control unit 13 and exchanges information therewith for example relating to a refractive index of the immersion medium that is currently supplied to the arrangement (symbolized by a dotted surface).

An exemplary embodiment of an arrangement according to the invention having an illumination objective 2 is illustrated schematically in FIG. 3 with a section through the illumination objective 2. Optical lenses 9.1 to 9.21 are arranged in a spatially fixed manner along the first optical axis A1 of the illumination objective 2. In addition, the first correction element 12.3 is arranged along the first optical axis A1.

A first lens group 9.1, which is formed in the exemplary embodiment by way of example by the front lens 9.11 and the optical lens 9.12, faces the sample 5. The lens 9.12 is optionally formed as a rotation-aspheric lens 9.12.

A second lens group 9.2 having the optical lenses 9.21 is present facing away from the sample 5 (see FIG. 1). An aperture stop 10 is arranged in the beam path between the first lens group 9.1 and the correction element 12.3.

The correction element 12.3 in the exemplary embodiment is formed by two Alvarez plates. The latter can be adjusted in each case relative to one another in a positioning direction using one of the adjustment devices 14.3 or 14.4. The positioning direction (symbolized by double-headed arrows) is substantially aligned transversely to the optical axis A1. The adjustment device 14.3 or 14.4 is actuable by means of the control commands of the control unit 13. FIG. 4 shows an exemplary embodiment of an arrangement according to the invention having a detection objective 3. The first lens group 9.1 with the optionally rotation-aspheric lens 9.12, the second lens group 9.2, and the aperture stop 10 are arranged in a spatially fixed manner along the second optical axis A2 of the detection objective 3. In addition, a displaceable optical lens 9.22 is optionally present as an integral part of the second lens group 9.2, which lens can be displaced in a controlled manner along the second optical axis A2 by means of an adjustment device 19. In addition, the first correction element 12.1 and the further correction element 12.2 are arranged along the optical axis A2. The correction elements 12.1 and 12.2 are again formed in each case by two Alvarez plates. The latter can be adjusted relative to one another and independently from one another in each case in a positioning direction transversely to the second optical axis A2 in each case using one of the adjustment devices 14.1 or 14.2. The adjustment devices 14.1, 14.2, and 19 are actuable by means of the control commands of the control unit 13. In further embodiments, an illumination objective 2 can be embodied accordingly. In this case, the displaceable optical lens 9.22 can be dispensed with.

The illustrated embodiment of the arrangement additionally shows a detector 18, which is connected to the control unit 13 in a manner suitable for exchanging data. The image data captured by means of the detector 18 can be transmitted to the control unit 13 and be evaluated there. If desired target parameters, such as specified image quality criteria, have not been met, it is possible to generate by means of the control unit 13 control commands, the execution of which by way of the actuated adjustment devices 14.1, 14.2, and/or 19 leads to the desired imaging qualities. The control can be realized in the form of feedback control. In order to compensate for any occurring wavefront errors, the correction elements 12.1, 12.2 are set accordingly, as is shown by way of example in FIG. 5, based on FIG. 4. The Alvarez plates or free-form elements of the correction elements 12.1, 12.2 are displaced, relative to one another and to the collimated beam path, transversely to the optical axis A2 and symmetrically along the respective positioning direction. The travels s1 and s2 of the respective correction elements 12.1, 12.2 and variable air gaps g1 and g2 in the direction of the propagation of detection radiation DS (see FIGS. 1 and 2) along an optical axis A2 of the detection objective 3 upstream (g1; g=gap) or downstream (g2) of a displaceable optical lens 9.22 are indicated merely symbolically.

An exemplary embodiment for specifically ascertained travels s1 and s2 of the respective correction elements 12.1, 12.2 and for variable air gaps g1 and g2 of a detection objective 3 is indicated in FIG. 6. In this figure, the values s1 and s2 indicate the respective travels of the Alvarez plates of the first correction element 12.1 or of the second correction element 12.2. The two columns on the right include the values s1, s2 and g1 and g2 for the slide 7 having a thickness of 0.15 mm or 0.19 mm.

REFERENCE SIGNS

1 Microscope
2 Illumination objective
3 Detection objective
4 Sample plane
Sample
6 Light sheet
7 Slide
8 Medium
9.1 First lens group
9.11 Front lens
9.12 Rotation-aspheric lens
9.2 Second lens group
9.21 Optical lens
9.22 Displaceable optical lens
10 Aperture stop
11 Sample stage
12.1 First detection correction element
12.2 Further detection correction element
12.3 First illumination correction element
12.4 Further illumination correction element
13 Control unit
14.1 First adjustment device for detection correction element
14.2 Further adjustment device for detection correction element
14.3 First adjustment device for illumination correction element
14.4 Further adjustment device for illumination correction element
15 Laser module
16 Beam shaping
17 XY scanner
18 Detector
19 Adjustment device (of a displaceable optical lens 9)
20 Supply apparatus
A1 First optical axis
A2 Second optical axis
BE Image plane
BS Illumination radiation
DS Detection radiation

The invention claimed is:

1. An arrangement for light sheet microscopy, comprising:
an illumination objective for illuminating a sample located on a slide in a medium via an illumination beam path with a light sheet, wherein the slide is aligned with respect to a planar reference surface;
a detection objective in a detection beam path having an optical axis that is directed substantially orthogonally onto the light sheet;
a separation layer system with at least one layer that is made from a specified material with a specified thickness and separates the medium from the illumination objective and the detection objective, wherein the separation layer system is in contact with the medium, at least in a region that is accessible for the illumination objective for illumination and for the detection objective for detection, by way of a base surface that is parallel to the planar reference surface;
a first adaptive optical detection correction element, which is arranged in the beam path of the detection objective or is able to be introduced into the beam path of the detection objective; and
a further adaptive optical detection correction element and/or a first adaptive optical illumination correction element, which is arranged in the beam path of the illumination objective or is able to be introduced into the beam path of the illumination objective, wherein aberrations, which arise due to oblique passage of light to be detected or of light for illuminating the sample through boundary surfaces of the separation layer system, are reduced by the first adaptive optical detection correction element and the further adaptive optical detection correction element and/or by the first adaptive optical illumination correction element, wherein the arrangement comprises at least one of
a first adjustment device for controlled movement of the first adaptive optical detection correction element;
a second adjustment device for controlled movement of the first adaptive optical illumination correction element; and/or
a third adjustment device for controlled movement of the further adaptive optical detection correction element; and the arrangement comprises a control unit, which is configured, on the basis of information relating to
current position of the first adaptive optical detection correction element and/or of the first adaptive optical illumination correction element,
current position of the further adaptive optical detection correction element,
current refractive index of an immersion medium used,
current refractive index of the sample, and/or
current refractive index of the medium; and
wherein the control unit generates control commands that actuate at least one of the first adjustment device, the second adjustment device, and the third adjustment device, to reduce aberrations.

2. The arrangement according to claim 1, wherein the arrangement comprises an optical lens, which is displaceable in a controlled manner along the optical axis of the detection objective, and an adjustment device for controlled movement of the optical lens.

3. The arrangement according to claim 1, wherein the illumination objective and/or the detection objective is an immersion objective.

4. The arrangement according to claim 1, wherein an optical axis of the illumination objective and the light sheet lie in a plane that encloses a non-zero illumination angle with a normal of the planar reference surface in respect of which the slide is aligned, and the optical axis of the detection objective encloses a non-zero detection angle with the normal of the planar reference surface.

5. The arrangement according to claim 1, wherein the first adaptive optical illumination correction element and/or the first adaptive optical detection correction element and the further adaptive optical detection correction element are formed in each case from a pair of optical elements that are movable relative to one another in a positioning direction.

6. The arrangement according to claim 5, wherein the positioning direction of the first adaptive optical detection correction element and of the further adaptive optical detection correction element are not parallel to one another.

7. The arrangement according to claim 1, further comprising:
a supply apparatus for supplying an immersion medium in front of a front lens of the detection objective and/or of the illumination objective, wherein the supply apparatus is configured to transmit information of the current refractive index of the immersion medium to the control unit.

8. A microscope, comprising the arrangement according to claim 1.

9. A method for reducing aberrations of an arrangement for microscopy, comprising:
arranging a sample located in a medium on a slide, wherein the slide is aligned with respect to a planar reference surface, and the slide is part of a separation layer system having a base surface that is aligned parallel to the planar reference surface and is in contact with the medium at least in a region that is accessible for an illumination objective for illumination and a detection objective for detection,
illuminating the sample through the separation layer system via an illumination beam path with a defined light intensity distribution using the illumination objective, wherein the illumination objective comprises a first adaptive optical illumination correction element, which is arranged in the illumination beam path or is able to be introduced into the illumination beam path, and optionally, a further adaptive optical illumination correction element;
capturing detection radiation of the sample through the separation layer system by a detection objective in a detection beam path, wherein an optical axis of the detection objective is directed substantially orthogonally to an optical axis of the illumination objective, and the detection objective comprises a first adaptive optical detection correction element, which is arranged in the detection beam path or is able to be introduced into the detection beam path, and a further adaptive optical detection correction element;
reducing aberrations that arise due to oblique passage of light to be detected or of light for illuminating the sample through boundary surfaces of the separation layer system, wherein control commands are generated based on information relating to
current position of the first adaptive optical detection correction element and/or of the first adaptive optical illumination correction element,
current position of the further adaptive optical detection correction element and/or of the further adaptive optical illumination correction element,
current refractive index of an immersion medium used,
current refractive index of the sample to be imaged, and/or
current refractive index of the medium, and
wherein adjustment devices of the first adaptive optical illumination correction element and the further adaptive optical illumination correction element, and/or of the first adaptive optical detection correction element and the further adaptive optical detection correction element, are actuated by the control commands.

10. The method according to claim 9, wherein image data captured by the detection objective is evaluated with respect to specified image quality criteria; wherein results of the evaluations are transmitted to the control unit, and the control commands of the control unit are generated taking into account the evaluation results.

11. The method according to claim 9, wherein the illuminating the sample through the separation layer system is via the illumination beam path with a light sheet.

* * * * *

UNITED STATES PATENT AND TRADEMARK OFFICE
CERTIFICATE OF CORRECTION

PATENT NO. : 11,841,490 B2
APPLICATION NO. : 17/463653
DATED : December 12, 2023
INVENTOR(S) : Marco Pretorius et al.

It is certified that error appears in the above-identified patent and that said Letters Patent is hereby corrected as shown below:

In the Specification

Under SUMMARY OF THE INVENTION, Column 3, Line 2, reads:
"wav"
And should read:
--way--;

Under SUMMARY OF THE INVENTION, Column 5, Line 8, reads:
"steps of"
And should read:
--steps of:--;

Under SUMMARY OF THE INVENTION, Column 5, Line 27, reads:
"(12.4),"
And should read:
--(12.4);--;

Under DETAILED DESCRIPTION OF THE INVENTION, Column 6, Line 44, reads:
"+15°,"
And should read:
--±15°,--; and Under REFERENCE SIGNS, Column 16, Line 3, reads:
"Sample"
And should read:
--5 Sample--.

Signed and Sealed this
Seventh Day of May, 2024

*Katherine Kelly Vidal*
Katherine Kelly Vidal
*Director of the United States Patent and Trademark Office*